(12) United States Patent
Uselton

(10) Patent No.: US 8,689,574 B2
(45) Date of Patent: Apr. 8, 2014

(54) DEDICATED DEHUMIDIFIER AND WATER HEATER

(75) Inventor: Robert Uselton, Plano, TX (US)

(73) Assignee: Lennox Industries Inc., Richardson, TX (US)

(*) Notice: Subject to any disclaimer, the term of this patent is extended or adjusted under 35 U.S.C. 154(b) by 872 days.

(21) Appl. No.: 12/862,901

(22) Filed: Aug. 25, 2010

(65) Prior Publication Data

US 2012/0047930 A1 Mar. 1, 2012

(51) Int. Cl.
*F25D 17/02* (2006.01)

(52) U.S. Cl.
USPC ............................. 62/181; 62/183; 62/196.4

(58) Field of Classification Search
USPC ............. 62/173, 176.6, 181, 183, 196.4, 331; 236/20 R
See application file for complete search history.

(56) References Cited

U.S. PATENT DOCUMENTS

| | | |
|---|---|---|
| 4,856,578 A | 8/1989 | McCahill |
| 5,050,394 A | 9/1991 | Dudley et al. |
| 5,052,186 A | 10/1991 | Dudley et al. |
| 5,062,276 A | 11/1991 | Dudley |
| 5,081,846 A | 1/1992 | Dudley et al. |
| 5,269,153 A | 12/1993 | Cawley |
| 5,351,502 A | 10/1994 | Gilles et al. |
| 5,465,588 A | 11/1995 | McCahill et al. |
| 6,055,818 A * | 5/2000 | Valle et al. ..................... 62/173 |
| 6,430,949 B2 * | 8/2002 | Noro et al. ...................... 62/183 |
| 6,666,040 B1 * | 12/2003 | Groenewold et al. ........... 62/173 |
| 7,155,922 B2 * | 1/2007 | Harmon et al. .............. 62/238.7 |
| 7,798,418 B1 * | 9/2010 | Rudd ........................... 236/49.3 |
| 2009/0229286 A1 * | 9/2009 | Ellis et al. ....................... 62/173 |

* cited by examiner

*Primary Examiner* — Marc Norman
(74) *Attorney, Agent, or Firm* — Hitt Gaines, PC

(57) ABSTRACT

The disclosure provides an apparatus for heating water and dehumidifying air and a water heating and air processing system. In one embodiment, the apparatus includes: (1) a refrigeration circuit including an evaporator, a first condenser and a compressor, (2) a refrigerant-water heat exchanger having a second condenser fluidly coupled to the refrigeration circuit and (3) a control valve operatively connected to the refrigeration circuit to either direct flow of the refrigerant through the first condenser during a dehumidification mode or through the second condenser during a water heating mode.

20 Claims, 3 Drawing Sheets

DEDICATED DEHUMIDIFIER AND WATER HEATER

TECHNICAL FIELD

Figure 1:
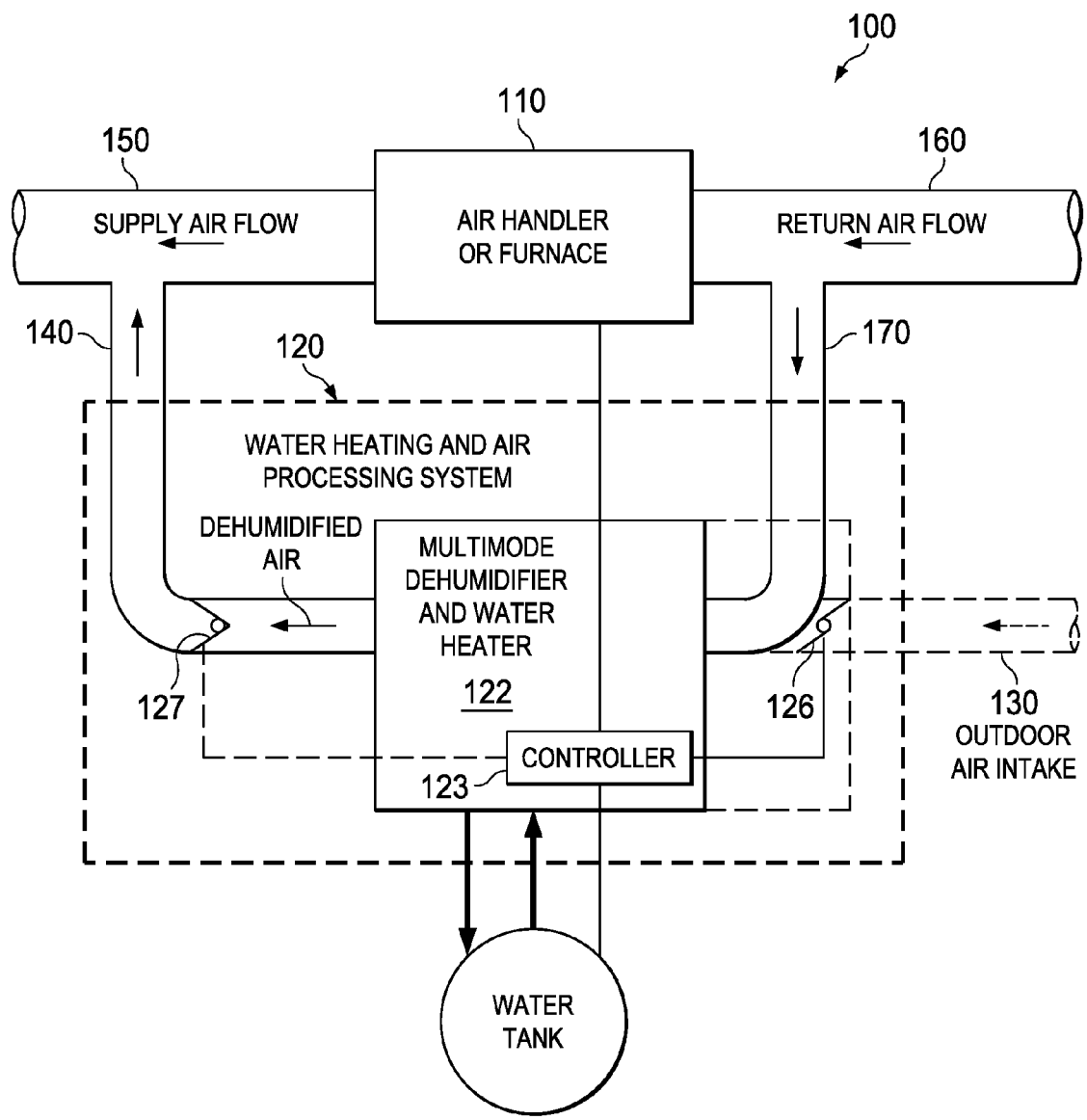

This application relates to heating water for use in an enclosure and processing air for the enclosure. More specifically, this application relates to a single apparatus for heating water and processing the air.

BACKGROUND

In an effort to reduce energy consumption, homes are being built with reduced air leakage compared to traditional building practices. Super insulated or sealed homes are being developed to reduce the loss of heated or cooled air and, therefore, reduce the overall amount of energy needed to heat or cool a home. With the super insulated or sealed homes, a need to control the intake of fresh air and a need for active dehumidification have been noticed.

Net-Zero Energy Homes (NZEH) is an example of a super insulated or sealed home. NZEH are designed to be all electric homes that generate some or all of their own power for the various energy requirements. In addition to the needs for controlled fresh air intake and active dehumidification, it has also been noticed that a significant portion of these all-electric homes may be dedicated to heating potable water for the homes.

SUMMARY

In one aspect, the disclosure provides an apparatus for heating water and dehumidifying air. In one embodiment, the apparatus includes: (1) a refrigeration circuit including an evaporator, a first condenser and a compressor, (2) a refrigerant-water heat exchanger having a second condenser fluidly coupled to the refrigeration circuit and (3) a control valve operatively connected to the refrigeration circuit to either direct flow of the refrigerant through the first condenser during a dehumidification mode or through the second condenser during a water heating mode.

In another aspect, a water heating and air processing (WHAP) system is disclosed. In one embodiment, the WHAP system includes: (1) a multi-mode dehumidifier and water heater including: (1A) a refrigeration circuit including an evaporator, a first condenser and a compressor, (1B) a refrigerant-water heat exchanger having a second condenser fluidly coupled to the refrigeration circuit and (1C) a control valve operatively connected to the refrigeration circuit to either direct flow of the refrigerant through the first condenser during a dehumidification mode or through the second condenser during a water heating mode. The WHAP system also includes: (2) fresh air ventilation dampers positioned to allow outside air flow across the evaporator and the first condenser and into the enclosure during a ventilation mode.

In yet another aspect, an environment operating and control (EOC) system for an enclosure is disclosed. In one embodiment, the EOC system includes: (1) a central heating, ventilating and air conditioning (HVAC) system having a circulating fan for moving air through the enclosure and (2) a water heating and air processing (WHAP) system for heating potable water for the enclosure and processing air for the enclosure, the WHAP system fluidly coupled to the central HVAC system and including: (2A) a multi-mode dehumidifier and water heater having: a refrigeration circuit including an evaporator, a first condenser and a compressor, a refrigerant-water heat exchanger having a second condenser fluidly coupled to the refrigeration circuit and a control valve operatively connected to the refrigeration circuit to either direct flow of the refrigerant through the first condenser during a dehumidification mode or through the second condenser during a water heating mode. The WHAP system also includes: (2B) a fresh air ventilation damper positioned to allow outside air to flow across the evaporator and the first condenser and into the enclosure during a ventilation mode.

BRIEF DESCRIPTION

Figure 2:
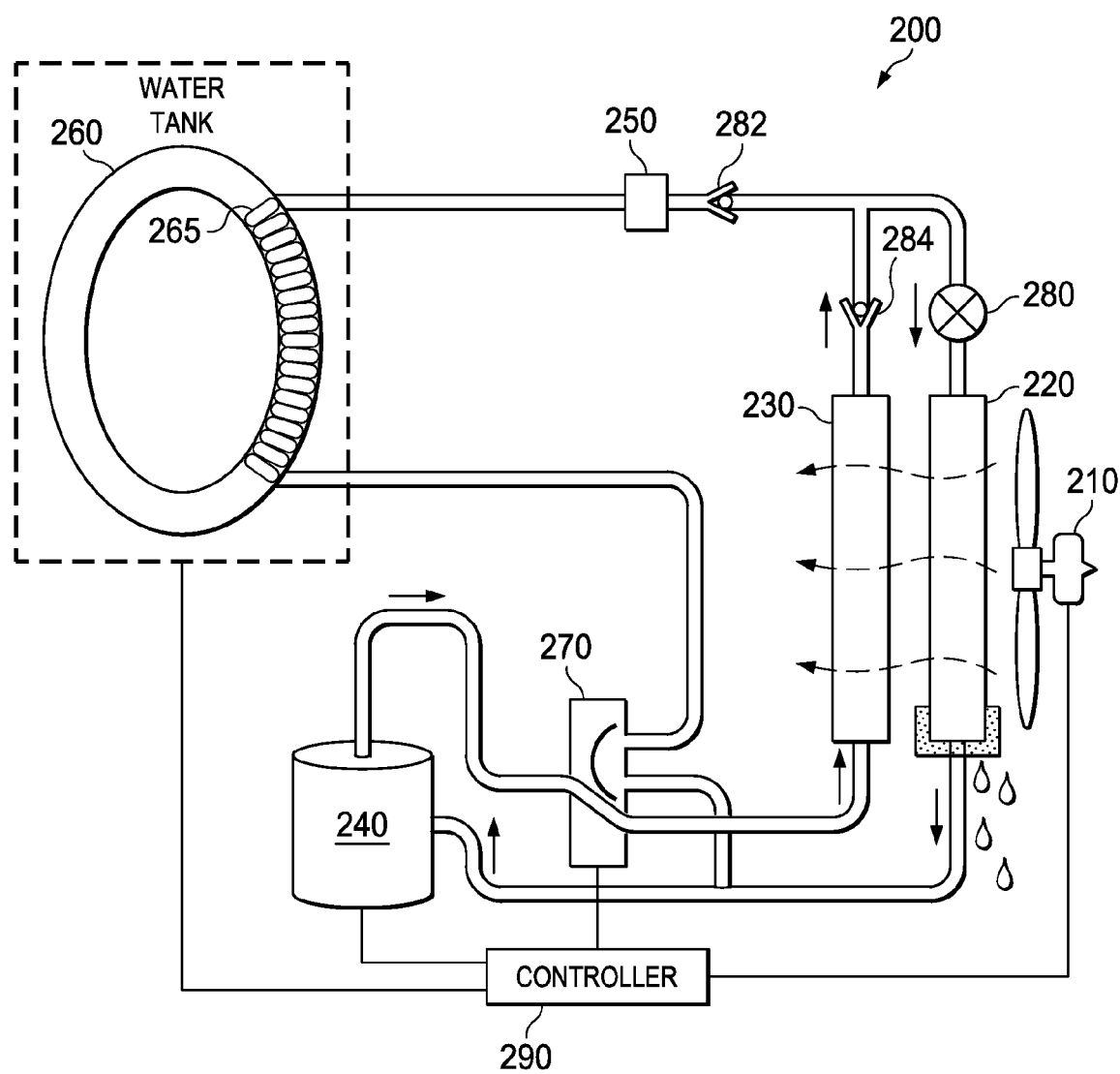
Figure 3:
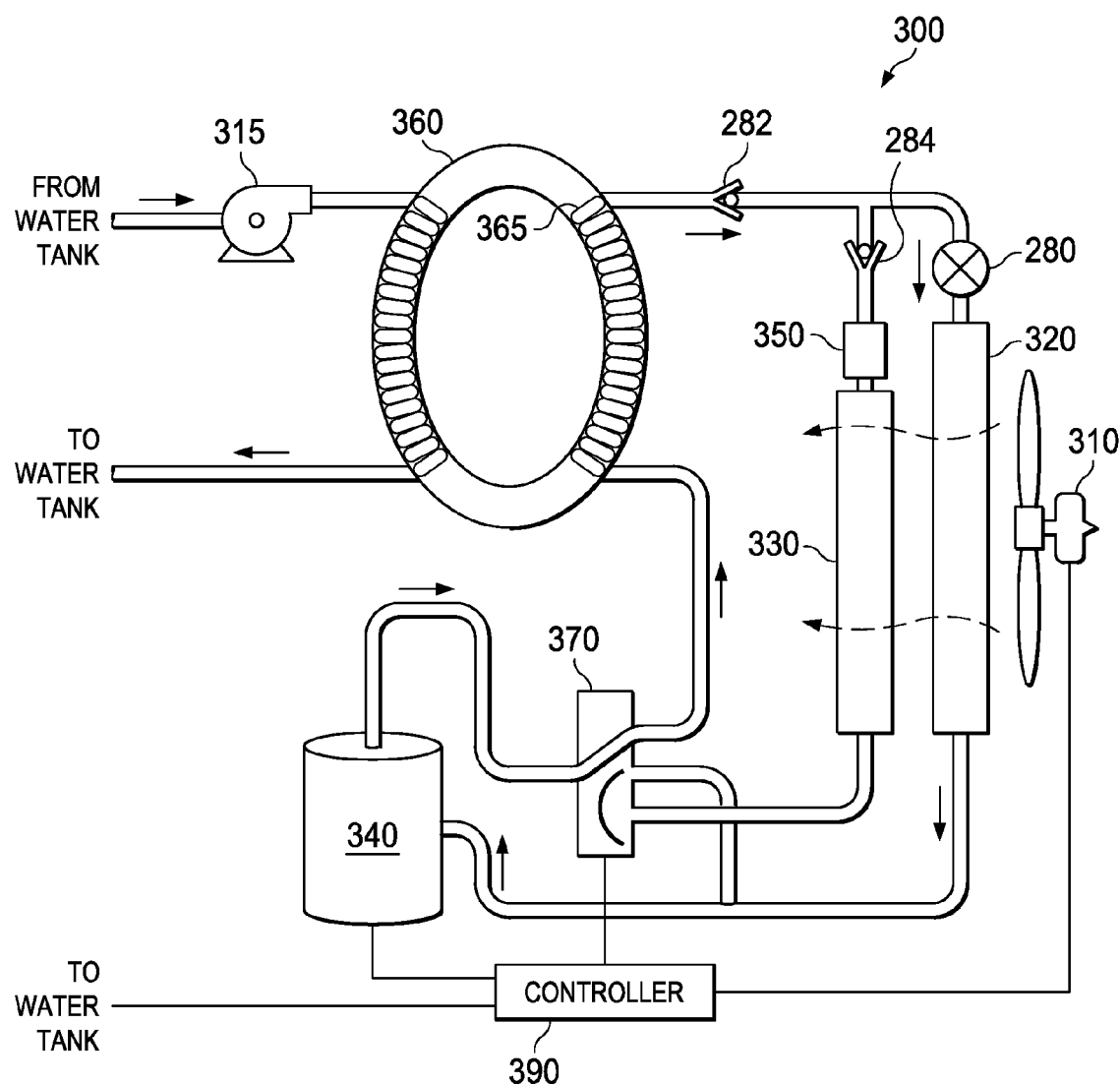

Reference is now made to the following descriptions taken in conjunction with the accompanying drawings, in which:

FIG. 1 illustrates a general schematic diagram of a environment operating and control system for an enclosure constructed according to the principles of the disclosure;

FIG. 2 is a general schematic diagram of an embodiment of a multi-mode dehumidifier and water heater operating in a dehumidification mode and constructed according to the principles of the disclosure; and FIG. 3 is a general schematic diagram of an embodiment of a multi-mode dehumidifier and water heater operating in a water heating mode and constructed according to the principles of the disclosure.

DETAILED DESCRIPTION

The disclosure provides a means for efficiently heating potable water in an all-electric building (e.g., a home or a business) and provide dehumidification for the building. In addition to dehumidifying, the disclosed multi-mode dehumidifier can also heat water and provide fresh air ventilation for the building. When the multi-mode dehumidifier is combined with an HVAC system, such as a heat pump, the combination can provide cooling, heating, water heating, dehumidification and ventilation. The combined systems, therefore, can provide an electric solution for the needed air processing and water heating functions of sealed homes such as NZE homes.

The multi-mode dehumidifier and water heater is designed to operate in a dehumidification mode or, alternatively, a water heating mode. Additionally, the multi-mode dehumidifier can operate in a ventilating mode. As such, the multi-mode dehumidifier can switch between the different operating modes to provide a specific functionality when needed. A dehumidifying and water heating (DWH) controller is used to determine when water heating, dehumidifying and ventilating are needed or required. The DWH controller includes an interface that receives data, such as temperature and humidity data, to determine when the particular operating mode is appropriate.

The disclosure, therefore, provides equipment that can be dedicated to dehumidification during a first mode and dedicated to heating water in a second mode. The equipment can also be used for fresh air ventilation in a third mode. Employing the disclosed multi-mode dehumidifier for the additional function of water heating can reduce energy costs, especially in warm climates. Additionally, combining the multi-mode dehumidifier with a central HVAC system, such as a heat pump, can provide an efficient energy package that is applicable to the moisture and ventilation problems of sealed buildings.

FIG. 1 illustrates a general schematic diagram of an environment operating and control system 100 for an enclosure constructed according to the principles of the disclosure. The enclosure may be a building such as a house or a business. In one embodiment, the enclosure is a super-insulated or sealed home that is all-electric. For example, the enclosure may be a Net-Zero Energy Home. The environment operating and control system 100 includes a central HVAC system 110 and a water heating and air processing (WHAP) system 120. A water tank of the enclosure is also illustrated in FIG. 1.

The central HVAC system 110 may be a conventional all-electric system that is used to provide heating or/and cooling for enclosures. The central HVAC system 110, for example, may be a conventional air handler or heat pump as noted in FIG. 1. The central HVAC system 110 includes the necessary ducts as illustrated in FIG. 1 to receive air from the enclosure and supply heated or cooled air to the enclosure. The central HVAC system 110 also includes other components typically included in a conventional central HVAC system that are needed to operate. For example, the central HVAC system 110 includes a circulating fan (not illustrated) that moves air through the enclosure.

The WHAP system 120 includes a multi-mode dehumidifier and water heater (MMDWH) 122 and fresh air ventilation dampers 126, 127. The MMDWH 122 includes a refrigeration circuit, a refrigerant-water heat exchanger and a control valve. Each of these components of the MMDWH 122 is not illustrated in FIG. 1. In FIG. 2 and FIG. 3, a more detailed illustration of an embodiment of a MMDWH is provided including these components.

The refrigeration circuit includes an evaporator, a first condenser and a compressor that circulates the refrigerant through the circuit. Additionally, the refrigeration circuit may include a refrigerant reservoir operatively connected thereto. The refrigerant-water heat exchanger includes a second condenser fluidly coupled to the refrigeration circuit. The second condenser may be coupled to the refrigeration circuit via conventional piping or conduit. The control valve is operatively connected to the refrigeration circuit to either direct flow of the refrigerant through the first condenser during a dehumidification mode or through the second condenser during a water heating mode. As such, the control valve is used to switch the flow of the refrigerant to the different condensers during the different modes. The control valve may be a conventional reversing valve used in HVAC installations. The compressor of the MMDWH 122 circulates the refrigerant through the first condenser or the second condenser depending on the different modes.

The MMDWH 122 also includes a dehumidifying and water heating controller (DWHC) 123. The DWHC 123 is configured to direct operation of the MMDWH 122 and the fresh air ventilation damper 126 for the water heating mode, the dehumidification mode and the ventilating mode. The fresh air ventilation damper (or backdraft damper) 127 typically operates automatically and is not coupled to the DWHC 123. However, in some embodiments, the fresh air ventilation damper 127 may also be coupled to the DWHC 123 for control (as indicated by the dashed line in FIG. 1). The DWHC 123 may be a controller that is typically used in a conventional dehumidifier but is also configured to perform the additional functionalities described herein.

In addition to being configured to direct the operation of a dehumidifier, the DWHC 123 is also configured to determine when to enter the water heating mode based on temperature data from a thermostat of the water tank. The thermostat may be a conventional thermostat used with a water tank that determines the water temperature of the water tank and provides the temperature or a representation thereof to the DWHC 123.

The DWHC 123 is also configured to determine when to enter the dehumidification mode and when to enter the ventilation mode. The dehumidification mode may be based on humidity data from a humidity sensor located in the enclosure. The ventilating mode may be determined based on a predetermined time interval. For example, government or industry standards may require or suggest fresh air requirements for an enclosure at time intervals that are predetermined. The fresh air requirements may also be based on volume instead of or in conjunction with time intervals.

The DWHC 123 may be configured to enable the different modes based on priority levels. User preferences, government requirements or industry standards may be used to set the different priority levels. The priority levels may also be based on installation locations such as different climate regions. In one embodiment, the DWHC 123 may be configured to enable the water heating mode when water heating is needed (i.e., temperature of water tank is too cool) even if there is a prior dehumidification mode request. The DWHC 123 includes the necessary logic circuitry to determine the various operating modes based on input data and direct the MMDWH 122 accordingly even when multiple modes are requested at the same time. The DWHC 123 also includes the necessary interfaces to receive user input and receive programming to direct operation thereof.

The WHAP system 120 is designed to heat potable water for the enclosure and process air for the enclosure. The air processing performed by the WHAP system 120 may include dehumidification and fresh air ventilation. The potable water heated by the WHAP system 120 may be stored in the water tank that is fluidly coupled to the WHAP system 120. The water tank may be a conventional hot water storage tank used in houses or businesses. The water tank is fluidly coupled to the MMDWH 122 via conventional piping or conduit. In some embodiments, the water tank is located at a distance from the refrigerant-water heat exchanger of the MMDWH 122 that a water pump is needed to circulate water between the MMDWH 122 (i.e., the refrigerant-water heat exchanger of the MMDWH 122 and the water tank. As such, in some embodiments the MMDWH 122 includes a water pump. The water pump may be a conventional pump that is used to circulate water. In other embodiments, the refrigerant-water heat exchanger is located proximate (including even within) the water tank and a water pump is not needed. In yet another embodiment, the WHAP system 120 may be co-located with the water tank where again a water pump is not needed.

The fresh air ventilation dampers include an intake damper 126 and a backflow damper 127. Each of these dampers 126, 127, may be conventionally installed in an inflow duct 130 that provides outdoor air for the enclosure or in a dehumidified air duct 140 that provides dehumidified air for the enclosure. In one embodiment, the intake damper 126 may be a type of mixing damper that is positioned and configured to control intake air flow from all return air to all fresh air. As indicated by the dashed extension of the MMDWH 122 in FIG. 1, the fresh air ventilation damper 126 may be included as part of the MMDWH 122 in some embodiments. The dehumidified air duct 140 also fluidly couples the WHAP system 120 to the central HVAC system 110 via a supply duct 150. The WHAP system 120 is also fluidly coupled to a return duct 160 of the central HVAC system 110 via an inflow duct 170. The ducts of the environment operating and control system 100 may be conventional flexible or rigid ducts that are used in HVAC systems.

FIG. 2 is a general schematic diagram of an embodiment of a MMDWH 200 constructed according to the principles of the disclosure. The MMDWH 200 includes a fan 210 and a refrigeration circuit including an evaporator 220, a first condenser 230, a compressor 240 and a refrigerant reservoir 250. Additionally, the MMDWH 200 includes a refrigerant-water heat exchanger 260 and a control valve 270. In this embodiment, the refrigerant-water heat exchanger 260 is located proximate a water source, such as in a water tank. As such, the MMDWH 200 does not need a water pump. The MMDWH 200 is operating in a dehumidification mode with the arrows representing the flow of the refrigerant.

In a dehumidification mode, the fan 210 circulates air over the evaporator 220 and the first condenser 230 of the refrigeration circuit. The fan 210 may circulate air that is ducted from a return air plenum of a central heat pump system or from an intake duct that provides fresh air. As the air moved by the fan 210 flows over the evaporator 220, the cooled air sheds moisture as the dry bulb temperature of the air is reduced below its saturation point. The heat from the hot, vapor refrigerant is then put into the flowing air by the first condenser 230. The compressor 240 moves the refrigerant along the refrigeration circuit from the low pressurized state evaporator 220 outlet to the hot and pressurized state that is cooled by the first condenser 230. The dehumidified air can then flow back into an enclosure via a supply duct system. This dehumidification process of the MMDWH 200 may operate in concert with a central HVAC system of the enclosure or can operate independently.

In the dehumidification mode, the control valve 270 operates to allow the refrigerant to flow through the refrigeration circuit and prevent flow of the refrigerant to the refrigerant-water heat exchanger 260 (i.e., a second condenser 265 that is located in the refrigerant-water heat exchanger 260). The control valve 270 may be a conventional reversing valve. In FIG. 2, a vent of the control valve 270 is coupled to the suction line of the compressor 240 to allow the compressor 240 to remove residual refrigerant from the inactive condenser. The refrigeration circuit also includes an expansion valve 280 and check valves 282, 284, that are positioned to prevent the backflow of the refrigerant through an inactive one of the first condenser 230 or the second condenser 265. For example, during the dehumidification mode, the check valve 282 prevents backflow of the refrigerant to the second condenser 265 and during the water heating mode, the check valve 284 prevents backflow of the refrigerant into the first condenser 230.

The refrigeration circuit also includes a refrigerant reservoir 250 that is operatively connected to the refrigeration circuit. The refrigerant reservoir 250 stores the refrigerant for use during particular operating modes. The location and size of the refrigerant reservoir 250 is based on the volumes of the first condenser 230 and the second condenser 265. In the MMDWH 200 the internal volume of the first condenser 230 is greater than the internal volume of the second condenser 265. As such, the refrigerant reservoir 250 provides a storage capacity that approximates the difference between the internal volumes of the first condenser 230 and the second condenser 265.

The MMDWH 200 includes a controller 290 that is configured to direct the operation of the MMDWH 200. The controller 290 may be configured to operate as the DWHC 123 of FIG. 1.

FIG. 3 is a general schematic diagram of an embodiment of a MMDWH 300 constructed according to the principles of the disclosure. The MMDWH 300 includes a fan 310 and a refrigeration circuit including an evaporator 320, a first condenser 330, a compressor 340 and a refrigerant reservoir 350. Additionally, the MMDWH 300 includes a refrigerant-water heat exchanger 360 and a control valve 370. In this embodiment, the refrigerant-water heat exchanger 360 is located distal from a water source, such as a water tank. As such, the MMDWH 300 also includes a water pump 315 that circulates water between the refrigerant-water heat exchanger 360 and the water tank. The MMDWH 300 is operating in a water heating mode with the arrows representing the flow of refrigerant and water.

In a water heating mode, the fan 310, evaporator 320, and compressor 340 may operate as their corresponding components of the MMDWH 200 operate as described in the dehumidification mode. In the water heating mode, however, the control valve 370 operates to allow the refrigerant to flow through the second condenser 365 and prevent flows of the refrigerant through the first condenser 330.

In the MMDWH 300, the refrigerant reservoir 350 is also located with the first condenser 330 indicating that the internal volume of the second condenser 365 is greater than the internal volume of the first condenser 330.

The MMDWH 300 includes a controller 390 that is configured to direct the operation of the MMDWH 300. The controller 390 may be configured to operate as the DWHC 123 of FIG. 1.

Those skilled in the art to which this application relates will appreciate that other and further additions, deletions, substitutions and modifications may be made to the described embodiments.

What is claimed is:

1. An apparatus, comprising:
   a refrigeration circuit including an evaporator, a first condenser and a compressor;
   a refrigerant-water heat exchanger having a second condenser fluidly coupled to said refrigeration circuit; and
   a control valve operatively connected to said refrigeration circuit to either direct flow of said refrigerant through said first condenser during a dehumidification mode or through said second condenser during a water heating mode.

2. The apparatus as recited in claim 1 further comprising a dehumidifying and water heating controller coupled to said control valve and configured to direct operation thereof for said water heating mode and said dehumidification mode.

3. The apparatus as recited in claim 2 wherein said dehumidifying and water heating controller is configured to determine said water heating mode based on temperature data from a thermostat of a water tank associated with said apparatus.

4. The apparatus as recited in claim 2 wherein said dehumidifying and water heating controller is configured to determine said dehumidification mode based on humidity data from a humidity sensor associated with said apparatus.

5. The apparatus as recited in claim 2 wherein said dehumidifying and water heating controller is configured to enable said dehumidification mode or said water heating mode based on priority levels.

6. The apparatus as recited in claim 5 wherein said dehumidifying and water heating controller is configured to establish said priority levels based on user input.

7. The apparatus as recited in claim 1 wherein said refrigerant-water heat exchanger is located proximate a hot water heater.

8. The apparatus as recited in claim 1 wherein said refrigerant-water heat exchanger is located distal from a hot water heater, said apparatus further comprising a water pump configured to circulate water between said refrigerant-water heat exchanger and said hot water heater.

9. The apparatus as recited in claim 1 further comprising a refrigerant reservoir operatively connected to said refrigeration circuit.

10. The apparatus as recited in claim 9 wherein said refrigerant reservoir is operatively connected at a location of said refrigeration circuit based on the volume of said first condenser compared to the volume of said second condenser.

11. A water heating and air processing (WHAP) system for heating potable water for an enclosure and processing air for said enclosure, said WHAP system comprising:
- a multi-mode dehumidifier and water heater including:
  - a refrigeration circuit including an evaporator, a first condenser and a compressor;
  - a refrigerant-water heat exchanger having a second condenser fluidly coupled to said refrigeration circuit; and
  - a control valve operatively connected to said refrigeration circuit to either direct flow of said refrigerant through said first condenser during a dehumidification mode or through said second condenser during a water heating mode; and
- a fresh air ventilation damper positioned to allow outside air to flow across said evaporator and said first condenser and into said enclosure during a ventilation mode.

12. The WHAP system as recited in claim 11 wherein said multi-mode dehumidifier and water heater further includes a dehumidifying and water heating controller coupled to said control valve and configured to direct operation of said multi-mode dehumidifier and said fresh air ventilation dampers for said water heating mode, said dehumidification mode and said ventilating mode.

13. The WHAP system as recited in claim 12 wherein said dehumidifying and water heating controller is configured to determine said water heating mode based on temperature data from a thermostat of a water tank of said enclosure.

14. The WHAP system as recited in claim 12 wherein said dehumidifying and water heating controller is configured to determine said dehumidification mode based on humidity data from a humidity sensor located in said enclosure.

15. The WHAP system as recited in claim 12 wherein said dehumidifying and water heating controller is configured to determine said ventilation mode based on a predetermined time interval.

16. The WHAP system as recited in claim 12 wherein said dehumidifying and water heating controller is configured to enable said dehumidification mode or said water heating mode based on priority levels.

17. The WHAP system as recited in claim 11 wherein said multi-mode dehumidifier and water heater further includes a water pump configured to circulate water between said refrigerant-water heat exchanger and a water tank of said enclosure.

18. The WHAP system as recited in claim 11 wherein said multi-mode dehumidifier and water heater further includes a refrigerant reservoir operatively connected to said refrigeration circuit.

19. The WHAP system as recited in claim 18 wherein said refrigerant reservoir is operatively connected at a location of said refrigeration circuit based on the volume of said first condenser compared to the volume of said second condenser.

20. An environment operating and control system for an enclosure, comprising:
- a central heating, ventilating and air conditioning (HVAC) system having a circulating fan for moving air through said enclosure; and
- a water heating and air processing (WHAP) system for heating potable water for said enclosure and processing air for said enclosure, said WHAP system fluidly coupled to said central HVAC system and including:
  - a multi-mode dehumidifier and water heater including:
    - a refrigeration circuit including an evaporator, a first condenser and a compressor;
    - a refrigerant-water heat exchanger having a second condenser fluidly coupled to said refrigeration circuit; and
    - a control valve operatively connected to said refrigeration circuit to either direct flow of said refrigerant through said first condenser during a dehumidification mode or through said second condenser during a water heating mode; and
  - fresh air ventilation dampers positioned to allow outside air flow across said evaporator and said first condenser and into said enclosure during a ventilation mode.

* * * * *